(12) United States Patent
Toddes

(10) Patent No.: US 9,439,410 B2
(45) Date of Patent: Sep. 13, 2016

(54) FLY LINE CONSTRUCTION

(71) Applicant: Cortland Line Co., Cortland, NY (US)

(72) Inventor: Steven Toddes, Cortland, NY (US)

(73) Assignee: CORTLAND LINE CO., Cortland, NY (US)

( * ) Notice: Subject to any disclaimer, the term of this patent is extended or adjusted under 35 U.S.C. 154(b) by 322 days.

(21) Appl. No.: 14/272,686

(22) Filed: May 8, 2014

(65) Prior Publication Data

US 2015/0320026 A1    Nov. 12, 2015

(51) Int. Cl.
*A01K 91/00* (2006.01)
*A01K 91/12* (2006.01)
*D04C 1/12* (2006.01)

(52) U.S. Cl.
CPC .................. *A01K 91/12* (2013.01); *D04C 1/12* (2013.01)

(58) Field of Classification Search
USPC ................... 43/44.98; 57/244, 238
See application file for complete search history.

(56) References Cited

U.S. PATENT DOCUMENTS

| | | | | |
|---|---|---|---|---|
| 4,779,372 A * | 10/1988 | Pozo Obeso | .......... | A01K 91/00 43/44.98 |
| 5,296,292 A * | 3/1994 | Butters | .................. | A01K 91/12 428/373 |
| 5,659,994 A * | 8/1997 | Cutter | .................... | A01K 91/12 43/44.98 |
| 5,776,343 A | 7/1998 | Cullen et al. | | |
| 5,802,828 A * | 9/1998 | Adorno | .................. | D02G 3/045 156/172 |
| 6,716,234 B2 * | 4/2004 | Grafton | ............ | A61B 17/06166 606/228 |
| 7,296,394 B2 * | 11/2007 | Clough | .................... | D07B 1/02 57/210 |
| 7,401,459 B2 * | 7/2008 | Bloch | .................... | A01K 91/00 57/230 |
| 7,409,815 B2 * | 8/2008 | Clough | .................. | D07B 1/068 57/212 |
| 8,181,438 B2 * | 5/2012 | Cook | ...................... | A01K 91/00 57/238 |
| 8,522,473 B2 * | 9/2013 | Nakanishi | .............. | A01K 91/00 43/44.98 |
| 2005/0086850 A1 * | 4/2005 | Clough | .................... | D01F 6/12 43/44.98 |
| 2010/0192758 A1 | 8/2010 | Clough | | |
| 2012/0090289 A1 | 4/2012 | Cook et al. | | |
| 2012/0285074 A1 * | 11/2012 | Yang | ........................ | D04C 1/12 43/44.98 |

* cited by examiner

*Primary Examiner* — Christopher P Ellis

(74) *Attorney, Agent, or Firm* — Leason Ellis LLP

(57) ABSTRACT

A line for use in angling sports, such as fly fishing, comprises a braid formed of polytetrafluorethylene (PTFE) strands and polyethylene (PE) strands. The PTFE strands and the PE strands are arranged such that in a rest position, an outer surface of the braid is defined by both the PTFE strands and the PE strands and when the braid is placed under tension, the outer surface of the braid is defined at least substantially by the PTFE strands due to bulging of the PTFE strands relative to the PE strands.

12 Claims, 3 Drawing Sheets

FLY LINE CONSTRUCTION

TECHNICAL FIELD

The present invention relates to fishing equipment and more specifically, relates to an improved line for use in certain angling sports, such as fly fishing.

BACKGROUND

Fishing is one of more popular sports in terms of participation and is generally the activity of catching fish. Angling is a method of fishing by means of an "angle" which is also known as a fish hook. The hook is usually attached to a fishing line and the line is typically attached to a fishing rod. Fishing rods are usually fitted with a fishing reel that functions as a mechanism for storing, retrieving, and paying out the line.

A fishing line is thus an elongated cord that is used or made for angling. Important parameters of a fishing line are its length, material and weight. It will be appreciated that the thicker the line, the increased visibility with respect to the fish.

There a number of different angling methods. For example, fly fishing is an angling method (sport) in which an artificial "fly" is used to catch fish. The fly is cast usually using a fly rod, reel and specialized line. Casting a nearly weightless fly or "lure" requires casting techniques that are significantly different from other forms of casting. Fly fishing can be done in fresh or salt water.

Fly lines consist of tough braided or monofilament core that is wrapped in a plastic sheet, most often a PVC sheath. Sometimes, the PVC sheath is embedded with air bubbles or with a material to give increased buoyancy and reduce wear.

Fly line backing is a term used in fly fishing that refers to a thin but very strong section of line that is secured directly to the arbor of a fly reel and to the back end of a fly line to provide an insurance policy of sorts on the fly angler's otherwise limited tackle when hooking, playing, and landing particularly fast or strong game fish species. Fly line backing is thus the extra line, which is attached to the rear end of your fly fine, which enables you to land fish that can run farther than the length of your fly line.

Backing is generally available in one of two varieties, Dacron® or gel-spun. The Dacron® variety is made of tough polyester material called polyethylene terephthalate (PETE), a synthetic resin developed for use in the construction of many of the world's most common plastics; PETE is used to manufacture everything from soda bottles to spinnaker sails in advanced racing boats. Dacron® is a trade name associated with PETE and can be spooled in long strands to create a tough synthetic line with a low coefficient of friction, making it perfect for fly line backing.

SUMMARY

A line for use in angling sports, such as fly fishing, comprises a braid formed of polytetrafluorethylene (PTFE) strands and polyethylene (PE) strands. The PTFE strands and the PE strands are arranged such that in a rest position, an outer surface of the braid is defined by both the PTFE strands and the PE strands and when the braid is placed under tension, the outer surface of the braid is defined at least substantially by the PTFE strands due to bulging of the PTFE strands relative to the PE strands.

As the line is stretched (i.e., a load is applied thereto), the PE strands bite into the PTFE strands, and push the PTFE strands to the surface of the braided line. This phenomena can be referred to as "pooching". Pooching refers to the bulging protrusion of the PTFE strands relative to the PE strands. The result of the pooching action is that the PTFE strands migrate to the outer surface of the braided line, while the PE strands assume a more central position. This phenomena results in the following: (1) it prevents the PE strands from cutting one another, increasing the realized tensile strength; (2) the exposed surface becomes "dimpled" with the PTFE, both protecting the PE strands from abrasion, and lowering the coefficient of friction on the surface of the braid.

BRIEF DESCRIPTION OF THE DRAWING FIGURES

DETAILED DESCRIPTION OF CERTAIN EMBODIMENTS

Figure 1:
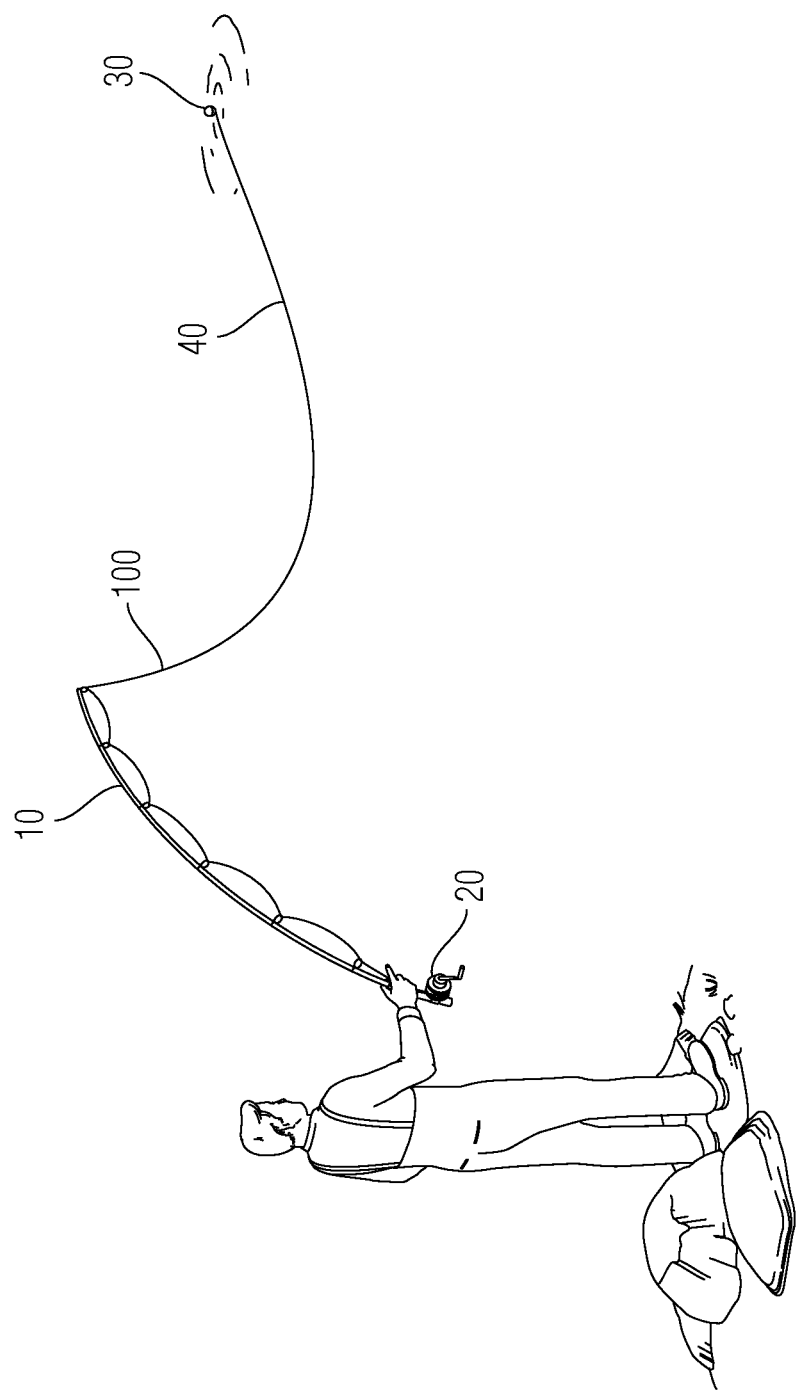
FIG. 1 is a schematic view of a fly line in accordance with one embodiment of the present invention and shown in use.

In accordance with one embodiment of the present invention, a fly line 100 is provided and shown in FIG. 1 in use in association with a fly fishing rod 10 and reel 20 for casting a lure 30 (otherwise known as a fly). The fly 30 can be attached to the line 100 using a leader and/or butt section 40. The fly 30, the leader 40, and line 100 are all constructed such that they float on the surface of the water in which they are cast.

The fly line 100 can be thought of as being fly line backing which, as mentioned above, is thus the extra line, which is attached to the rear end of your fly line, which enables you to land fish that can run farther than the length of your fly line. It will be understood that while the fly line 100 has particular utility as a fly line backing, the line 100 can be used in other applications besides as a backing.

In accordance with the present invention, the fly line (backing) 100 is in the form of a structure formed of two different types of fibers (filaments) that are intimately coupled to one another to form the fly line 100. The line 100 is thus formed of first fibers or filaments 110 and second fibers or filaments 120, with the first fibers being formed of a different material than the second fibers. The first and second fibers can be interlaced together to form a braided structure (line 100). As is known, a braid is a complex structure or pattern formed by intertwining (interlacing) three or more strands, such as textile fibers, filaments, etc. The strands themselves can be in the form of a bundle of fibers, filaments and thus, the braiding operation involves intertwining individual bundles each formed of a plurality of fibers/filaments. The interlacing of the first and second fibers 110, 120 can also be thought of as an interweaving step.

Braided structures, such as ropes, etc., are commonly described in terms of the total numbers of strands. For example, an 8-strand braid includes eight strands that are twisted (braided) together, a 12-strand braid includes twelve strands that are twisted (braided) together. Most braided structures are constructed from an equal number of "S-strands" (strands that twist to the left) and "Z-strands" (strands that twist to the right). This creates a balanced, or torque-neutral construction that will not naturally twist while under load.

Figure 2:
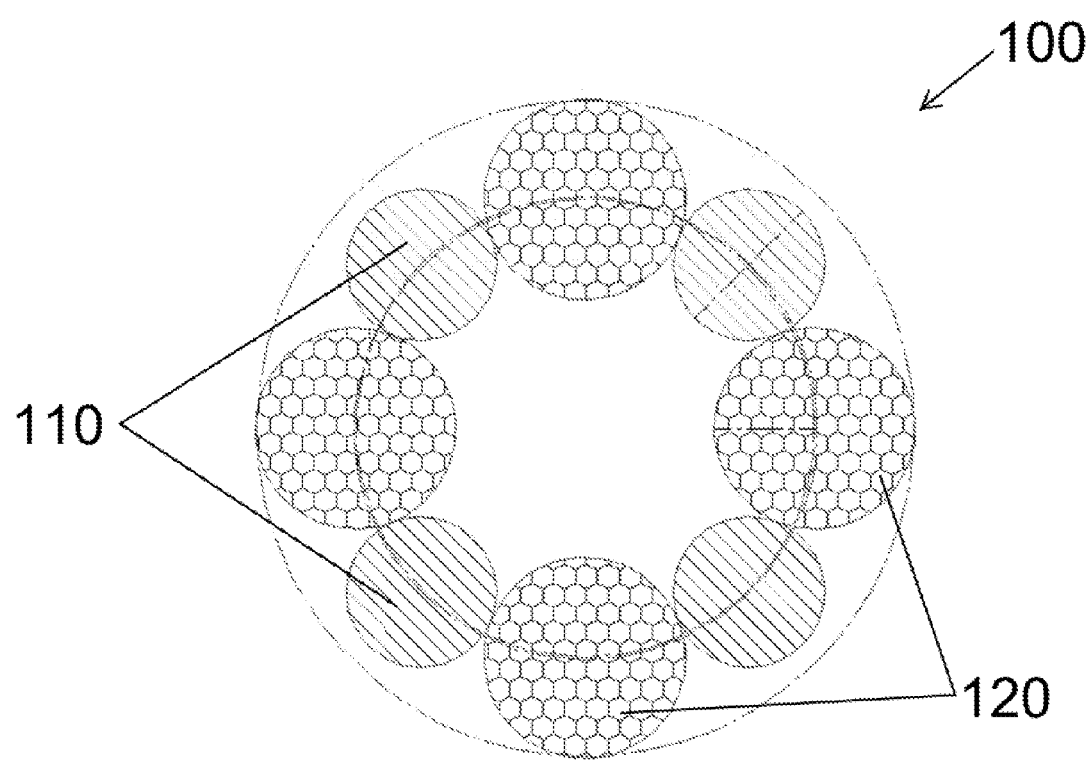
FIG. 2 is a cross-sectional view of the fly line of FIG. 1 in a relaxed state.

As shown in FIG. 2, the line 100 is in the form of a braided line that is formed of a plurality of first strands 110 (first fibers/filaments) and a plurality of second strands 120 (second fibers/filaments). The first and second strands 110, 120 are coupled to one another using any number of traditional techniques, including a manual or automated braiding machine which combines all of the strands to form the braided structure. The final resultant structure is a braid as shown in FIG. 2.

In accordance with one embodiment, the first strands 110 (fibers/filaments) are polytetrafluorethylene (PTFE), which is a synthetic fluoropolymer of tetrafluoroethylene. The best known brand name of PTFE is Teflon® by Dupont Co. The second strands 120 (fibers/filaments) are synthetic fibers other than PTFE. In accordance with one embodiment, the second strands 120 are in the form of polyethylene (PE) fibers.

It will also be appreciated that the first fibers 110 (PTFE) and the second fibers 120 (PE) are readily commercially available and come in a number of different constructions depending upon the intended application. For example, the first and second fibers 110, 120 can come in different sizes (different diameters).

Figure 3:
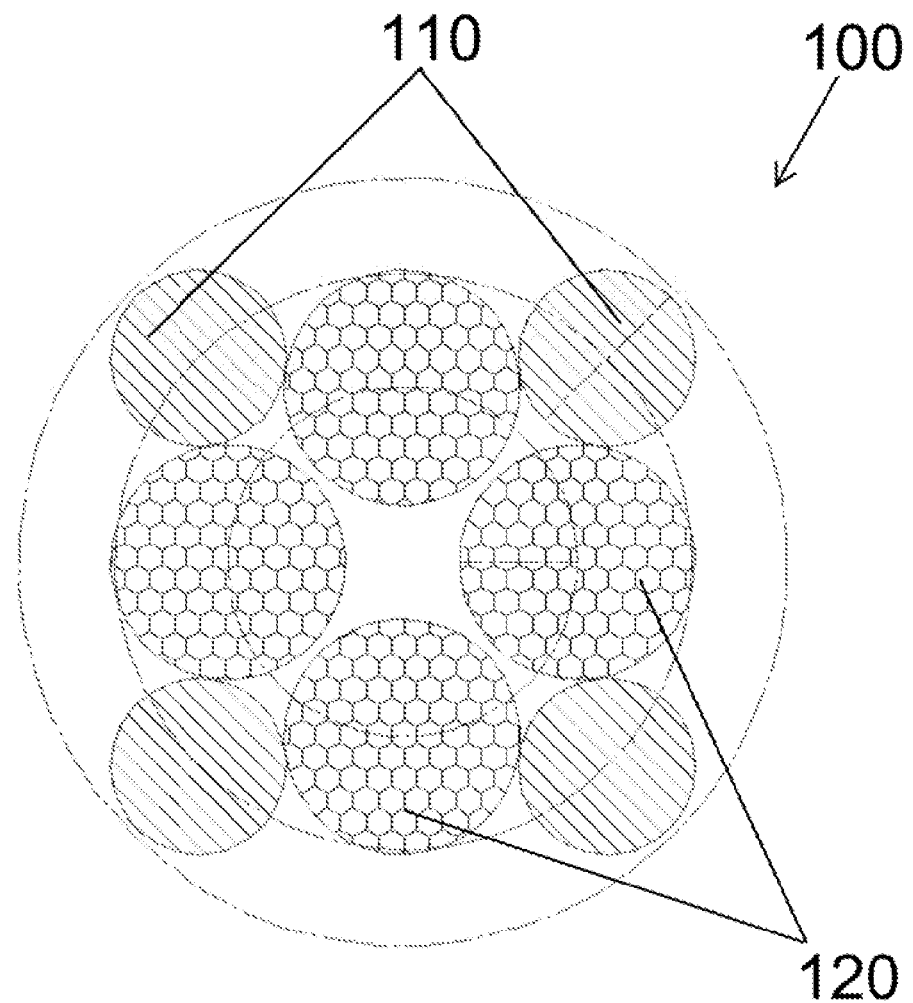
FIG. 3 is a cross-sectional view of the fly line under tension.

FIG. 2 shows the line 100 in a first condition which is a rest position of the line, while FIG. 3 shows the line 100 when it is under tension (an axial force has been applied). The line 100 shown in FIG. 2 is thus is braid form and the strands 110, 120 define a line that is generally circular in cross-section.

EXAMPLES

The present invention will be further appreciated in view of the following Examples which are exemplary and not limiting of the scope of the present invention. Table 1 sets forth below the characteristics and performance summary for the braid constructions of Examples 1-4.

For each example, the "construct" column sets forth the total number of strands that are used to form the braid and the balanced nature of the braid (i.e., the number of Z twist strands is equal to the number of S twist strands). The diameter column is a measurement of the diameter of the braided line. The Ult. Tensile column is the ultimate tensile strength (often shortened to tensile strength) which is the maximum stress that a material can withstand while being stretched or pulled before failing or breaking.

TABLE 1

| Example | Construct | PTFE Fiber | PE Fiber | Diameter | Ult. Tensile | Strain @ Break |
|---|---|---|---|---|---|---|
| 1 | 4 (s) × 4 (z) | Teflon | Pegasus | .0127" | 15.2 lbs | 39% |
| 2 | 6 (s) × 6 (z) | Teflon | Pegasus | .0150" | 24.5 lbs | 44% |
| 3 | 6 (s) × 6 (z) | Teflon | Pegasus | .0198" | 33.1 lbs | 44% |
| 4 | 6 (s) × 6 (z) | Teflon | Spectra | .0275" | 58.1 lbs | 92% |

The PE fiber identified as "Pegasus" is PE fiber that is commercially available from Pegasus materials, and "Spectra" is PE fiber that is commercially available under this trade name.

Example 1 is an 8-strand braid, while Examples 2-4 are 12-strand braids.

In accordance with the present invention, the line 100 which is formed of a blend of fibers (a braid) as discussed herein provides a number of advantages over traditional fly lines. In particular, the present Applicant has discovered that the disclosed blend of fibers (PTFE and PE) creates an incredibly slick and strong line with many unique properties.

As shown in FIG. 3, as the line 100 is stretched (a load is applied thereto), the PE fibers 120 bite into the PTFE fibers 110, and push the PTFE 120 to the surface of the braided line 100. This phenomena is called pooching. Pooching refers to the bulging/protrusion of the PTFE 120 relative to the PE fibers 110. The result of the pooching action is that the PTFE 120 migrates to the outer surface of the braided line 100, while the PE fibers 110 assume a more central position. This phenomena results in the following: (1) it prevents the PE fibers 110 from cutting one another, increasing the realized tensile strength; (2) the exposed surface becomes "dimpled" with the PTFE, both protecting the PE fibers from abrasion, and lowering the coefficient of friction on the surface to that of pure PTFE. For example, the coefficient of friction in the line 100 is about 78% lower than Spectra fly line (a PE only line); and (3) if pressure is applied to the side of the braid 100 while under tension, the braid 100 temporally flattens.

The "slippery" nature of the outer surface (low coefficient of friction) was experienced during an experiment in which while the braid 100 was being spooled, the braid 100 was grasped in a hand and bent back on top of itself as the brain 100 ran in an S shape over/under the hand while the braid was squeeze. To even attempt to move running Masterbraid brand line (100% PE) would have cut straight to bone, while the braid 100 ran across the hand without damaging the hand.

The braided line 100 is super-hydrophobic, and because of water's high surface tension, the hydrophobicity is nearly equivalent to that of pure PTFE. The braided line 100 will actually hover on water undisturbed and then cut right through water with very little drag once submerged (much less drag than a thinner Spectra brand line).

All of the aforementioned advantages are obtained without the use of coatings or any post processing. The braided lines 100 that were tested and are described in Table 1 are only respooled off the braiders (of a braiding machine). The lack of post processing both lowers the cost of the braided line 100 to a price that is significantly less than Masterbraid brand line and also results in a product without a surface to wear away or flake off.

The color of the braided line 100 is true silver. The exemplary PTFE used in formation of the braided line 100 contains 3% carbon from processing and is often referred to as "brown" or raw PTFE. This is the least expensive PTFE to buy. When the fiber is braided, the carbon is dispersed enough to actually refract light (like powdering otherwise black charcoal), creating a metallic silver look. It will be appreciated that other grades and types of PTFE can equally be used in the practice of the present invention.

Exemplary application for the braided line 100 particularly include: (1) saltwater backing: #2-#5 of most importance (the braided line 100 offers better performance relative to 30 lb and 50 lb gel-spun backing in cost and performance, and only slightly larger in diameter (between that of Dacron brand line and Spectra brand line); and (2) bowfishing line: preferably, #2, #5-#7 (the present line offers improved performance relative to Spectra or Dacron brand lines.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A line for use in angling sports comprising:
a braid formed of first fibers and second fibers, wherein the first fibers comprise polytetrafluorethylene (PTFE) fibers and the second fibers comprise polyethylene (PE) fibers, wherein the braid is configured such that when the braid is placed under tension, the PTFE fibers bulge outwardly relative to the PE fibers and define an outer surface of the braid, while the PE fibers are located centrally within the braid.

2. The line of claim 1, wherein the line comprises a fly line backing.

3. The line of claim 1, wherein the braid comprises an 8-strand braid formed of four strands of first fibers and four strands of second fibers.

4. The line of claim 1, wherein the braid comprises a 12-strand braid formed of six strands of first fibers and six strands of second fibers.

5. The line of claim 1, wherein the braid has an outer diameter between about 0.01 inch and about 0.03 inch.

6. The line of claim 1, wherein the braid has a generally circular shape.

7. The line of claim 1, wherein the braid is constructed from an equal number of S-strands that twist to the left and Z-strands that twist to the right to form balanced braid, the S-strands being one of the PTFE fibers and the PE fibers, the Z-strands being the other of the PTFE fibers and the PE fibers.

8. The line of claim 1, wherein in a rest position, the PTFE fibers and the PE fibers define an outer surface of the braid and in a second position in which the braid is under tension, the outer surface of the braid is at least substantially defined by the PTFE fibers.

9. The line of claim 8, wherein in the second position, the PE fibers are in closer proximity to one another relative to their positions in the rest position.

10. A line for use in angling sports comprising:
a braid formed of polytetrafluorethylene (PTFE) strands and polyethylene (PE) strands, wherein the PTFE strands and the PE strands are arranged such that in a rest position, an outer surface of the braid is defined by both the PTFE strands and the PE strands and when the braid is placed under tension, the outer surface of the braid is defined at least substantially by the PTFE strands due to bulging of the PTFE strands relative to the PE strands.

11. A method for forming a line for use in angling sports comprising the steps of: braiding polytetrafluorethylene (PTFE) strands with polyethylene (PE) strands to form a braided structure, wherein the PTFE strands and PE strands are braided such that in a rest position, an outer surface of the braid is defined by both the PTFE strands and the PE strands and when the braid is placed under tension, the outer surface of the braid is defined at least substantially by the PTFE strands due to bulging of the PTFE strands relative to the PE strands.

12. The method of claim 11, wherein the braided structure is balanced in that it includes the same number of S twisted strands as Z twisted strands.

* * * * *